Figure 1:
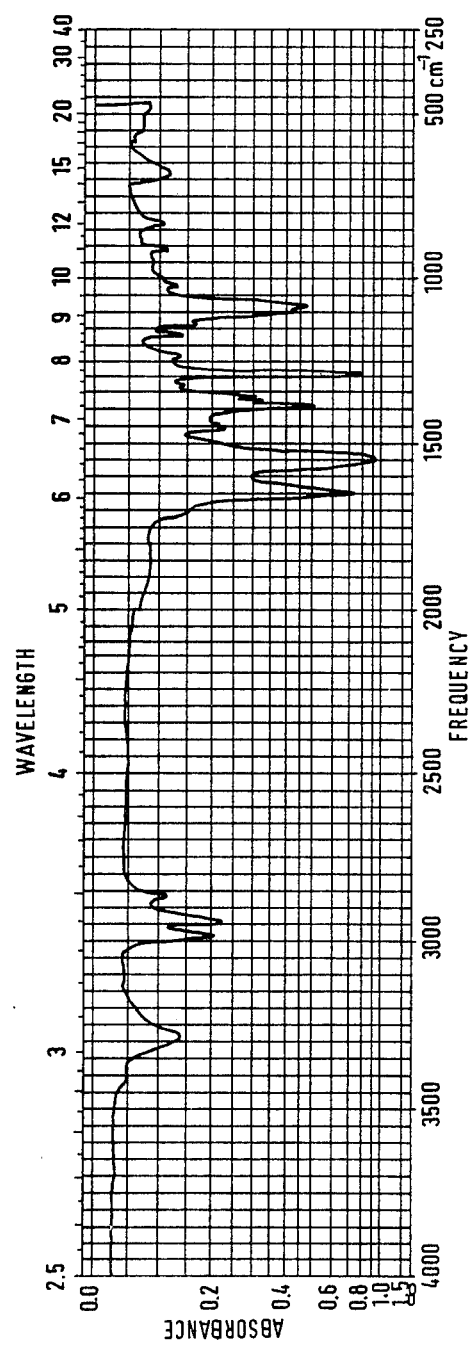

United States Patent [19]

Dalibor

[11] 4,132,843

[45] Jan. 2, 1979

[54] BLOCKED POLYISOCYANATES FORMED FROM HEXAMETHYLENE-1,6-DIISOCYANATE AND ACETOACETIC ACID $C_3$-$C_5$ ALKYL ESTERS

[75] Inventor: Horst Dalibor, Norderstedt, Fed. Rep. of Germany

[73] Assignee: Hoechst Aktiengesellschaft, Fed. Rep. of Germany

[21] Appl. No.: 779,234

[22] Filed: Mar. 18, 1977

[30] Foreign Application Priority Data

Mar. 25, 1976 [DE] Fed. Rep. of Germany ....... 2612784

[51] Int. Cl.$^2$ ...................... C08G 18/80; C08G 18/73
[52] U.S. Cl. ......................................... 528/45; 528/55; 528/57; 560/169
[58] Field of Search ................. 260/77.5 TB; 560/169

[56] References Cited

U.S. PATENT DOCUMENTS

| | | | |
|---|---|---|---|
| 3,926,875 | 12/1975 | Tsugukuni et al. | 260/77.5 TB |
| 3,950,285 | 4/1976 | Wolgemuth | 260/77.5 TB |
| 3,993,849 | 11/1976 | Victorius | 260/77.5 TB |
| 4,007,215 | 2/1977 | Hartmann | 260/77.5 TB |

OTHER PUBLICATIONS

Chem. Abstracts, vol. 53, No. 2, Jan. 25, 1959, 1200b, (Iwakura et al.).

*Primary Examiner*—H.S. Cockeram
*Attorney, Agent, or Firm*—Gordon W. Hueschen

[57] ABSTRACT

The invention relates to completely or partially blocked diisocyanates.

4 Claims, 3 Drawing Figures

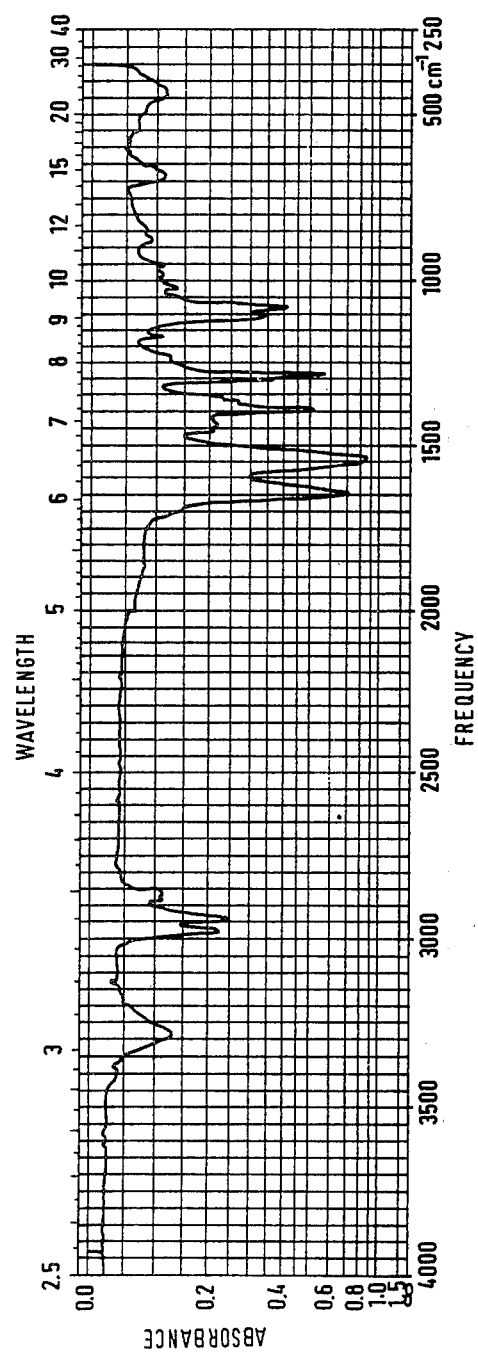

BLOCKED POLYISOCYANATES FORMED FROM HEXAMETHYLENE-1,6-DIISOCYANATE AND ACETOACETIC ACID $C_3$-$C_5$ ALKYL ESTERS

BACKGROUND OF THE INVENTION

The manufacture of blocked or masked polyisocyanates is known and is described in Houben-Weyl "Methoden der Organischen Chemie" ("Methods of Organic Chemistry"), volume 14/2, pages 61–70.

Reaction products of hexamethylene-1,6-diisocyanate with tert.-butanol, phenol, acetoacetic acid ethyl ester, malonic acid ester, acetylacetone, phthalimide, imidazole, hydrogen chloride, hydrogen cyanide and caprolactam are known.

This aliphatic diisocyanate was reacted with compounds which are split off again at elevated temperature to liberate the isocyanate group. Products of this type are designated isocyanate donors or "moderators". In contrast with the free diisocyanates, masked diisocyanates of this type makes it possible to manufacture mixtures with substances or solvents which contain hydroxyl groups, without a reaction taking place in the course thereof. It is therefore possible, by means of masked polyisocyanates, to manufacture mixtures with products which contain hydroxyl groups, such as higher molecular polyesters or polyethers, and which are stable on storage and only give the desired isocyanate reactions at an elevated temperature. They are of great importance both for the manufacture of rubber-elastic products via storable intermediate stages and for the manufacture of wire lacquers, and in the textile field. The donor effect comes about because virtually all adducts which are formed from isocyanates at a moderately elevated temperature redissociate once more at higher temperatures, equilibria being set up. The establishment of these equilibria is accelerated by adding tertiary bases.

In combination with polymers containing hydroxyl groups, many of these masked polyisocyanates exhibit an unsatisfactory crosslinking at low stoving temperatures. Other masked polyisocyanates which redissociate at lower temperatures produce scission products which must not be employed for stoving lacquerings because of their toxicity.

A known adduct, manufactured from hexamethylene diisocyanate and acetoacetic acid ethyl ester, admittedly does not produce scission products which are particularly toxic and also redissociates at a low stoving temperature. The known adduct has a melting point of 81–82° C. and must therefore be manufactured in the melt above the melting point temperature, that is to say at about 90° C., as a result of which an undesirable yellow coloration takes place which can only be removed by recrystallisation. This solid adduct has a tendency to crystallise and leads to an undesirable inhomogeneity in the manufactured lacquer solutions. Thus, for example, stoved lacquers with greatly impaired film properties are produced by the combination of polymers containing hydroxyl groups and the known adduct.

It is an object of the invention to provide completely or partially blocked diisocyanates which exist as liquids at room temperature and are soluble in inert solvents which are customary in the lacquer industry.

It is a further object of this invention to provide blocked liquid polyisocyanates which produce, in the temperature range of 80 to 130° C., preferably 90 to 130° C., crosslinked reaction products in the presence of polymers containing hydroxyl groups.

SUMMARY

The invention relates to completely or partially blocked diisocyanates of the formula III

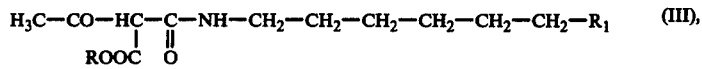

wherein $R_1$ denotes the radical

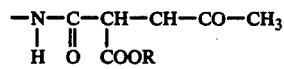

or NCO and R denotes propyl, isopropyl, n-butyl, tert.-butyl, isobutyl, sec.-butyl or pentyl radicals.

The pentyl radical can be present in 8 isomeric forms (neglecting optical antipodes) as individuals or as a mixture. The starting product, pentanol, for the manufacture of the acetoacetic acid pentyl ester which is reacted with the polyisocyanate can, for example, be a commercially available fusel oil or a fermentation amyl alcohol, 1-pentanol (n-amyl alcohol or n-butylcarbinol), $H_3C$—$(CH_2)_3$—$CH_2OH$; 2-pentanol (sec.-amyl alcohol or methylpropylcarbinol), $CH_3$—$(CH_2)_2$—CHOH—$CH_3$; 3-pentanol (diethylcarbinol), $CH_3$—CH$_2$—CHOH—$CH_2$—$CH_3$; primary or secondary isoamyl alcohols (3-methyl-1-butanol or 3-methyl-2-butanol, respectively), $(CH_3)_2CH$—$CH_2$—$CH_2OH$ or $(CH_3)_2CH$—CHOH—$CH_3$, respectively; or 2-methyl-1-butanol, 2,2-dimethyl-1-propanol or tert.-amyl alcohol (2-methyl-2-butanol).

The new, completely or partially blocked diisocyanates of the formula III are manufactured by reacting an acetoacetic acid alkyl ester in which the alkyl radical is R, with hexamethylene-1,6-diisocyanate, at elevated temperature.

The subject of the invention is a process for the manufacture of a blocked diisocyanate of the formula (I)

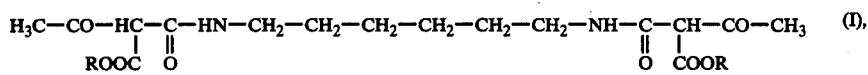

wherein R denotes a propyl, isopropyl, n-butyl, tert.-butyl, isobutyl, sec.-butyl or pentyl radical, characterised in that an acetoacetic acid alkyl ester in which the alkyl radical is R, is reacted with hexamethylene diisocyanate in a molar ratio of 2.0 to 2.1 : 1, by warming in the presence of a catalyst.

A further subject of the invention is a process for the manufacture of a partially blocked diisocyanate of the formula (II)

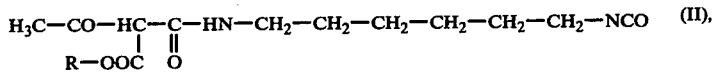

wherein R denotes a n-propyl, isopropyl, n-butyl, tert.-butyl, isobutly, sec.-butyl or pentyl radical, characterised in that an acetoacetic acid alkyl ester in which the alkyl radical is R, is reacted with hexamethylene diisocyanate in a molar ratio of 1.0 to 1.05 : 1, by warming in the presence of a catalyst.

In the manufacture of a new compounds of the formula (I), the reaction is carried out at 60 to 120° C., preferably 70 to 100° C. Reaction times from 2 to 20 hours are required for this purpose. Since the reaction proceeds exothermically if the reactants are employed as a mixture, it is preferred not to employ a mixture which, from the start, contains the two reactants in equivalent proportions. It is preferred to introduce the acetoacetic acid alkyl ester and the catalyst into the reaction vessel and to heat them to the desired reacion temperature and to maintain this temperature. Then, after reaching the reaction temperature, the hexamethylene diisocyanate is gradually added in the course of several hours. The mixture is then kept at the reaction temperature until the reaction is virtually complete, at a conversion of at least 95%. After cooling to room temperature, the reactants which have not yet been converted react further, so that the reaction can be regarded as complete after a maximum of 3 weeks' storage time.

A preferred embodiment of the process for the manufacture of the new compounds of the formula (II) is characterised in that the hexamethylene diisocyanate and the catalyst are warmed to about 60 to 90° C. in the reaction vessel and the required quantity of acetoacetic acid alkyl ester is added gradually, in the course of 1 to 3 hours, whilst maintaining the same temperature and the mixture is then kept at the reaction temperature until the reaction product of the formula (II) has been obtained.

As crude products, the resulting reaction products are relatively very pale, slightly yellowish liquids which are used, without further chemical treatment processes, in the lacquer and synthetic resin industries. In every case the crude reaction products are liquids at 10 to 80° C. The particular advantage of the new compounds consists in the fact that they can be manufactured from the components, in the presence of catalysts, as liquids by reacting at fairly low temperatures between approximately 60° C. and 120° C., preferably 70 to 100° C., with the exclusion of solvents.

The following can be used as catalysts: sodium, sodium ethylate and zinc acetylacetonate. The latter is particularly advantageous, since it gives products which are completely free from turbidity. Reaction products having the desired low viscosities are also obtained by this process. These new compounds are distinguished by quite special technological properties. They do not possess the disadvantage which have been described of the blocked polyisocyanates hitherto known. Lacquer combinations consisting of copolymers which contain hydroxyl groups and wich are based on hydroxyalkyl esters of acrylic or methacrylic acid and esters of acrylic or methacrylic acid crosslink with the new, completely blocked polyisocyanate at 80 to 130° C. under the conditions of a conversion from masked NCO : OH = 0.5 to 1 : 1 , and produce very resistant lacquerings. As a result of the low viscosity of the new, completely or partially blocked diisocyanate, in the binder combination with the copolymers containing hydroxyl groups, as described above, high solids contents are obtained in the stable lacquer solutions, which have been adjusted to a state ready for spraying, and these give lacquers of low solvent content and thus take account of the requirements of environmental protection.

The new, completely or partially blocked diisocyanates of the present invention can be used quite generally for all the purposes in lacquer and plastics chemistry in which completely or partially blocked diisocyanates have already been used successfully.

The following examples are mentioned of polymers containing polyhydroxyl groups or synthetic resins containing hydroxyl groups, which can be crosslinked under hot conditions with the masked diisocyanates according to the invention: saturated polyester resins, unsaturated polyester resins, saturated or unsaturated, oil-modified or fatty acid-modified alkyd resins, phenol/formaldehyde resols, aminoplast resins, polyurethane resins, polyethers, epoxide resins, cellulose acetobutyrate and copolymers containing hydroxyl groups.

Polyester resins which can be used are those which contain, in a co-condensed form, aliphatic and aromatic dicarboxylic acids having 4 to 12 carbon atoms and polyols having 2 to 10 carbon atoms and 2 to 4 primary or secondary hydroxyl groups. Saturated and unsaturated polyester resins of this type are described in Houben-Weyl "Makromolekulare Stoffe II" ("Macromolecular Materials II"), volume 14/2, pages 4 to 42.

Oil-modified or fatty acid-modified alkyd resins which can be used are those which contain, in a co-condensed form, 10 to 50% by weight of saturated or unsaturated aliphatic fatty acids having 8 to 18 carbon atoms, dicarboxylic acids having 4 to 12 carbon atoms and polyols having 2 to 10 carbon atoms and 2 to 4 primary or secondary hydroxyl groups, such as are described in Wagner/Sarx "Lackkunstharze" ("Synthetic Resins for Lacquers"), 5th Edition, pages 99 to 123.

Phenol-resols which are used are those such as are described in Houben-Weyl "Macromolekulare Stoffe II" ("Macromolecular Materials II"), volume 14/2, pages 220 to 230.

Aminoplast resins which can be used are those such as are described in Wagner/Sarx "Lackkunstharze" ("Synthetic Resins for Lacquers"), 5th Edition, pages 61 to 80.

Epoxide resins which are used are those which are obtained by reacting bisphenol A and epichlorohydrin in an alkaline medium. Such resins have epoxide equivalents of 450 to 4,000 and softening points, by Durran's method, of 65 to 155° C. Such epoxide resins are described in Houben-Weyl "Makromolekulare Stoffe II" ("Macromolecular Materials II"), volume 14/2, pages 468 to 475.

Cellulose esters having 1 to 4 carbon atoms in the ester radical which are employed are those which have a butyryl content of 17 to 55% by weight, an acetyl content of 2 to 40% by weight and a hydroxyl content of 0.5 to 5% by weight. Mixed fatty acid esters of cellulose are described in Houben-Weyl "Makromolekulare Stoffe II" ("Macromolecular Materials II"), volume 14/2, pages 877 to 879.

Copolymers which are used are those which contain, in a copolymerised form, acrylic acid or methacrylic acid esters having 1 to 8 carbon atoms in the alcohol radical, hydroxyalkyl acrylate and/or hydroxyalkyl methacrylates and, if appropriate, also other polymerisable monomers, the products having hydroxyl numbers from 33 to 300. Such copolymers are described in the book by Wagner/Sarx "Lackkunstharze" ("Synthetic Resins for Lacquers"), 5th Edition (1971), pages 230 to 235.

The mixing ratio is 5 to 50% by weight of the reaction products according to the invention, consisting of hexamethylene-1,6-diisocyanate and of acetoacetic acid alkyl esters, and 50 to 95% by weight of synthetic resins containing hydroxyl groups. The mixing ratio includes the further requirement that 0.3 to 1.2 NCO groups are employed as blocked isocyanate groups for one hydroxyl group.

Synthetic resins 1 to 4 which contain hydroxyl groups and which are used, for example, for stoved coatings, are illustrated in Table 1 which follows.

The test results of coatings produced with stoving lacquers are shown in Table 2 which follows. The synthetic resins mentioned in Table 1 and the completely masked diisocyanates which have been obtained in accordance with the examples, have been used in these tests.

These scouting investigations show that the products of this invention can be utilised industrially in a versatile manner. The good film transparency should be singled out. This means that the components contained in the lacquer do not exhibit any incompatibility phenomena after stoving. Furthermore, the stoved films have a high gloss and a good surface hardness, as shown by the pendulum hardness test. The stoved films are highly elastic and have good resistance to organic solvents. The stoved films do not exhibit yellowing.

The products, according to the invention, from the polyisocyanate/acetoacetic acid alkyl ester adducts are also outstandingly suitable for touching-up lacquer coatings consisting of resins which are in themselves not crosslinked with isocyanates but which contain groups capable of reacting with isocyanates, such as, for example, alkyd resins and polyacrylates. They impart to coating films of this type a high gloss, high flexibility and an improved resistance to solvents and weathering.

The lacquer solutions and coatings manufactured using the polyisocyanate/acetoacetic acid alkyl ester adducts according to the invention can contain the pigments and additives which are customary in the lacquer industry.

Table 1

| Synthetic resins | Composition of the synthetic resins which are to be used with the reaction products, according to the invention, formed from hexamethylene-1,6-diisocyanate and acetoacetic acid alkyl esters |
|---|---|
| 1 | Epoxide resin based on bisphenol A and epichlorohydrin, having an epoxide equivalent weight of 875 – 1,000, described in the leaflet "Beckopox EP 304" of Messrs. Hoechst |
| 2 | Unplasticised melamine/formaldehyde resin, as a 55% strength solution in xylene/butanol, density at 20° C 1.008, described in the leaflet "Maprenal TTX" of Messrs. Cassella |
| 3 | Castor oil alkyd resin having an oil content of 35% and a phthalic anhydride content of 40%, described in the leaflet "Alftalat AR 351" of Messrs. Hoechst |
| 4 | Copolymer solution consisting of 20% by weight of styrene, 20% by weight of hydroxyethyl methacrylate, 30% by weight of methyl methacrylate, 30% by weight of butyl acrylate and 100% by weight of xylene. The viscosity of the 50% strength solution in xylene is V, measured on the Gardner-Holdt scale. The hydroxyl number has a value of 80. |

Table 2
Stoved coatings formed from synthetic resins containing hydroxyl groups and the reaction products, according to the invention, from hexamethylene-1,6-diisocyanate and acetoacetic acid alkyl esters

| | 1 | 2 | 3 | 4 |
|---|---|---|---|---|
| Synthetic resin used, according to Table 1 | 70% by weight | 70% by weight | 80% by weight | 80% by weight |
| Example 1 according to the invention | 30% by weight | 30% by weight | 20% by weight | 20% by weight |
| Stoving temperature 130° C for 40 minutes | | | | |
| Film transparency | 1 | 1 | 1 | 1 |
| Gloss | 1 | 1 | 1 | 1 |
| Yellowing | 1 | 1 | 1 | 1 |
| Pendulum hardness by Konig's method | 225 seconds | 220 seconds | 90 seconds | 195 seconds |
| Elasticity | 1–2 | 3 | 1 | 2 |
| Resistance to xylene for 6 minutes | 2–3 | 1 | 2 | 1 |
| Stoving temperature 150° C for 40 minutes | | | | |
| Film transparency | 1 | 1 | 1 | 1 |
| Gloss | 1 | 1 | 1 | 1 |
| Yellowing | 1 | 1 | 1–2 | 1 |
| Pendulum hardness by Konig's method | 220 seconds | 214 seconds | 88 seconds | 195 seconds |
| Elasticity | 1 | 2 | 1 | 2 |
| Resistance to xylene for 6 minutes | 2 | 1 | 2 | 1 |

Assessment of the stoved coatings: 1 = highest value; 5 = lowest value

EXAMPLE 1

59 g (0.41 mol) of acetoacetic acid isopropyl ester and 0.05 g of zinc acetylacetonate are heated to 95° C. under nitrogen and while stirring, 0.2 mol = 33.6 g of hexamethylene-1,6-diisocyanate are uniformly added dropwise in the course of 2 hours while maintaining the temperature at 95° C. and the mixture is kept at 95° C. for two hours.

The NCO content is 0.5%. The viscosity is M, measured on the Gardner-Holdt scale. The iodine colour number, measured in accordance with DIN Instruction 6,162 using the Lovibond 1,000 Comparator, is 7. Refractive index: $n_D 22 = 1.5032$.

FIG. 1 shows the infrared absorption spectrum of the reaction product which was obtained according to Example 1.

EXAMPLE 2

70.5 g, 0.41 mol, of acetoacetic acid n-amyl ester and 0.06 g of zinc acetylacetonate are heated to 95° C. under nitrogen gas and while stirring, 0.2 mol = 33.6 g of hexamethylene-1,6-diisocyanate are uniformly added dropwise in the course of two hours at the same temperature and the mixture is reacted at 95° C. for 2 hours.

The NCO content is 0.2%. The viscosity is F-G, measured on the Gardner-Holdt scale. The iodine colour number has a value of 4. Refractive index: $n_D 22 = 1.5030$.

Figure 2:
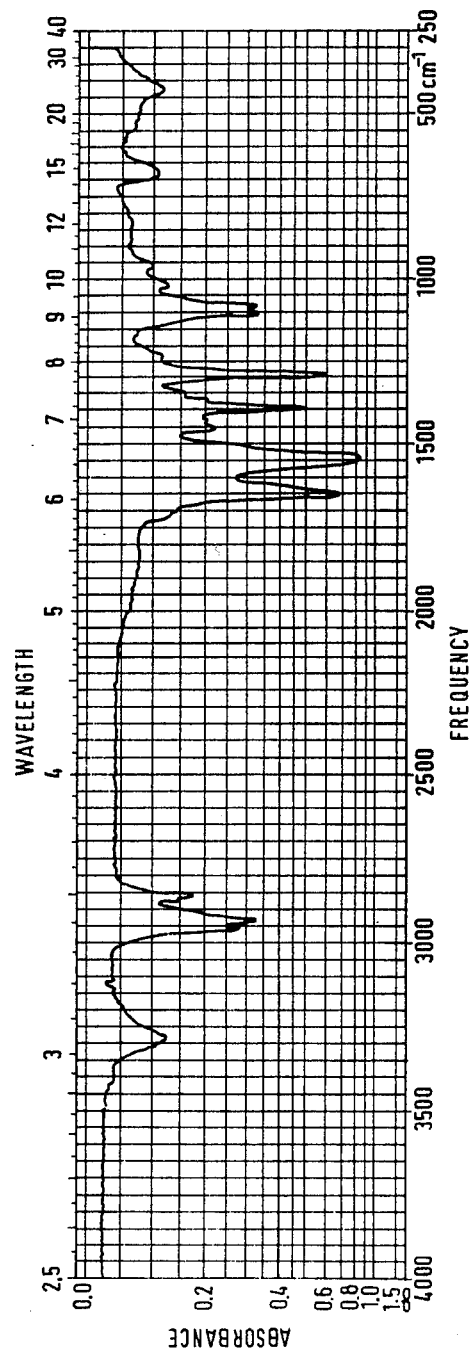

FIG. 2 shows the infrared absorption spectrum of the reaction product which was obtained according to Example 2.

EXAMPLE 3

64.8 g (0.41 mol) of acetoacetic acid sec.-butyl ester and 0.06 g of zinc acetylacetonate are heated to 95° C. while stirring and passing in nitrogen, 0.2 mol = 33.6 g of hexamethylene-1,6-diisocyanate are added uniformly in the course of 2 hours and the reaction is completed at 95° C. over the course of 2 hours.

The NCO content is 0.4%. The viscosity is M-N, measured on the Gardner-Holdt scale. The iodine colour number reaches a value of 4. Refractive index: $n_D 22 = 1.5036$.

FIG. 3 shows the infrared absorption spectrum of the reaction product which was obtained according to Example 3.

EXAMPLE 4

84 g (0.5 mol) of hexamethylene diisocyanate and 0.1 g of zinc acetylacetonate are heated to 75° under nitrogen gas and while stirring, 79 g (0.5 mol) of acetoacetic acid tert.-butyl ester are uniformly added dropwise in the course of two hours at the same temperature and the mixture is reacted at 75° C. for one hour.

The NCO content is 8.2%. The viscosity is X, measured on the Gardner-Holdt scale. The iodine colour number has a value of 4. Refractive index: $n_D 22 = 1.4979$.

As Examples 1 to 3 show, the blocked diisocyanates prepared according to the process of the invention have a NCO content, after manufacture, of about 0.2 to 0.5% by weight. Thin layer chromatographic investigations have shown that the process products of this invention are free from the diisocyanate which was employed. The NCO content is due to the (mono-masked) reaction product formed from 1 mol of 2,2,4-trimethylhexamethylene diisocyanate and 1 mol of acetoacetic acid alkyl ester.

The masking progresses if the process products are stored at room temperature, so that there is a NCO content of less than 0.1% by weight after about 2 to 3 weeks from the data of manufacture. The reaction product prepared according to Example 4 represents a mono-masked product in which there is a residual NCO content of 8.2%.

The test results reproduced in Table 2 were obtained by applying the mixtures, present in solvents, to glass plates at a dry film layer thickness of 50 to 60 μm.

I claim:

1. Process for the manufacture of a blocked diisocyanate of the formula

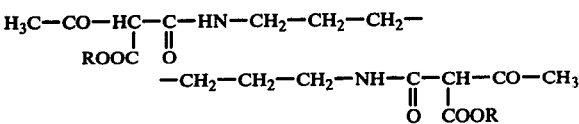

wherein R denotes an n-propyl, isopropyl, n-butyl, tert.-butyl, isobutyl, sec.-butyl or pentyl radical, characterised in that an acetoacetic acid alkyl ester in which the alkyl radical is R, is reacted with hexamethylene-1,6-diisocyanate in a molar ratio of 2.0 to 2.1:1, by warming in the presence of a catalyst.

2. Process for the manufacture of a partially blocked diisocyanate of the formula

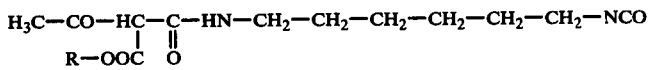

wherein R denotes an n-propyl, isopropyl, n-butyl, tert.-butyl, isobutyl, sec.-butyl or pentyl radical, characterised in that an acetoacetic acid alkyl ester in which the alkyl radical is R, is reacted with hexamethylene-1,6-diisocyanate in a molar ratio of 1.0 to 1.05:1, by warming in the presence of a catalyst.

3. Process according to claim 2, characterised in that the hexamethylene-1,6-diisocyanate and the catalyst are warmed to about 60 to 90° C. in the reaction vessel and the required quantity of acetoacetic acid alkyl ester is added gradually in the course of 1 to 3 hours while maintaining the said temperature and the mixture is then kept at the reaction temperature until the reaction product of claim 2 has been obtained.

4. Method which comprises crosslinking polymers containing hydroxy groups with a blocked diisocyanate of the formula

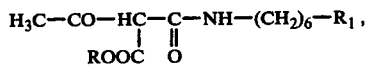

wherein $R_1$ donates the radical

n-propyl, isopropyl, n-butyl, tert.-butyl, isobutyl, sec.-butyl, or pentyl radical at a temperature of 80 to 130° C.

* * * * *

UNITED STATES PATENT AND TRADEMARK OFFICE
CERTIFICATE OF CORRECTION

PATENT NO. : 4,132,843
DATED : Janaury 2, 1979
INVENTOR(S) : Dalibor

It is certified that error appears in the above-identified patent and that said Letters Patent are hereby corrected as shown below:

Col. 2, line 26, second formula; "-N-C-CH-CH-CO-CH$_3$" should -- -N-C-CH-CO-CH$_3$ --
                                            H O   COOR      read     H O  COOR Col. 2, lines 40 & "CH$_3$-CH-
          41 ; 2-CHOH-CH$_2$CH$_3$" is incorrectly hyphenated and should read -- CH$_3$-CH$_2$-CHOH-CH$_2$-CH$_3$ --

Col. 3, line 6; "isobutly" should read -- isobutyl --
Col. 3, line 11; "a" should read -- the --
Col. 3, line 20; "reacion" should read -- reaction --
Col. 3, line 59; "disadvantage" should read -- disadvantages --
Col. 3, line 62; "wich" should read -- which --
Col. 5, Table 1, part 3, lines 2 & "des-
                     3 ; scribed" should read -- des-cribed --
Col. 7, line 24; "75° under" should read -- 75° C under --
Col. 7, line 46; "data" should read -- date --
Col. 8, line 49; After the last formula there is a group of words left out of the patent. The group of words should read -- or NCO and R denotes an -- Response and Amendment dated May 4, 1978, page 1, claim 6.

Signed and Sealed this

Fifth Day of June 1979

[SEAL]

Attest:

RUTH C. MASON
Attesting Officer

DONALD W. BANNER
Commissioner of Patents and Trademarks